United States Patent [19]
Grandjanny

[11] 3,751,772
[45] Aug. 14, 1973

[54] TERMINAL GRIPPING DEVICE FOR ELASTIC CORD

[76] Inventor: Charles Grandjanny, 102, Avenue General Leclerc, 69 Caluire, France

[22] Filed: Apr. 23, 1971

[21] Appl. No.: 136,912

[30] Foreign Application Priority Data
May 13, 1970 France .............................. 7017322

[52] U.S. Cl. .............................................. 24/126 C
[51] Int. Cl. ............................................. F16g 11/00
[58] Field of Search ............. 24/84, 123 BC, 123 C, 24/126 R, 136 R, 126 C

[56] References Cited
UNITED STATES PATENTS
| 27,906 | 4/1860 | Howard | 24/126 R |
| 2,535,623 | 12/1950 | Becker | 24/126 X |

FOREIGN PATENTS OR APPLICATIONS
| 153,594 | 3/1932 | Switzerland | 24/126 R |
| 856,533 | 6/1940 | France | 24/126 C |
| 11,163 | 5/1899 | Great Britain | 24/123 C |
| 1,052,776 | 12/1966 | Great Britain | 24/136 |

*Primary Examiner*—Paul R. Gilliam
*Attorney*—Raymond A. Robic

[57] ABSTRACT

The invention is a terminal cord gripping device for securing a hook on the end of an elastic cord, the device comprising a gripper capping the end of the elastic cord and a hook formed with a conical hole; the gripper having flexible gripping jaws and being inserted into the conical hole through its wide opening for self-tightening of the gripper on the cord end as it is driven into the conical hole.

3 Claims, 3 Drawing Figures

PATENTED AUG 14 1973　　　　　　　　　　　3,751,772
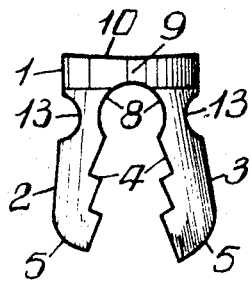
FIG.1
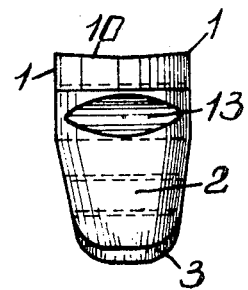
FIG.2
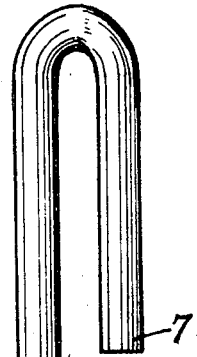
FIG.3
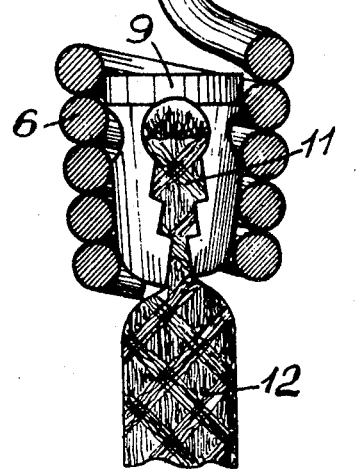
INVENTOR
Charles GRANDJANNY
*Raymond A. Aelin*
ATTORNEY

TERMINAL GRIPPING DEVICE FOR ELASTIC CORD

BACKGROUND OF THE INVENTION

1. Field of the Invention

The present invention relates to the attachment of a hook and of a plastic gripper on the end of an elastic cable, the attaching assembly constituting expanders, stretchers, elastic straps, luggage-holder, exercisers and the like.

2. Description of the Prior Art

In known stretchers, the end members or hooks are generally constituted by a steel wire (coated or not with plastic) wound as a conical spiral or by a steel sheet or by plastic material through which is provided a conical hole. These end members or hooks are stopped by a knot twisted at each end of the elastic cable or by a loop at the end of the elastic cable which is held by a clip or by an opened ring set through the end of the elastic cable. The said knots, loops or rings are mounted through the inner part of the cone of the end member or the hook. Such holding means are precarious when the elastic cables are extensively and repeatedly stressed. In fact, the tensioning of the elastic cable reduces its thickness and the knot has a tendency to untie itself, the loop has a tendency to slide through the clip or the cable has a tendency to slide through the ring and consequently, to separate the combination of the hook and the end of the cable. On the other hand, the making of a knot or a loop at the end of the cables constitutes a waste of material and requires an additional working time and complex automatic devices.

Also, the retention by a ring is not an esthetic arrangement. During the manipulation, the hooks do not remain at the end of the cable where they have been placed but may slide towards the middle of the tensioning device.

SUMMARY OF THE INVENTION

The device according to the present invention permits to prevent these disadvantages.

The invention is essentially directed to a device comprising: a gripper made of plastic material and having a base from one face of which at least two gripping jaws project which are spaced from one another freely to receive therebetween the cord to be gripped and which are provided with transverse gripping serrations, the base and jaws being joined together and constructed so as to allow the jaws to flex at the end thereof adjacent the base and move toward one another upon being clamped whereby to grip the cord end. The device also comprises a connector formed with a frusto-conical through hole of a size suitable to allow the gripper to be force fitted into it whereby, in use, one end of the elastic cord is inserted in the gripper between the jaws and the gripper is force fitted into the frusto-conical hole through its large opening thus causing flexing and gradual closing of the jaws over the cord end and biting of the serrations into the cord end.

This device offers the following advantages:
an accentuated and efficient self-tightening for each extension of the elastic cable,
no lost of length of the cable,
a saving of time for the assembly of the hook and cable,
an improved esthetic appearance,
the hooks always remain at the end of the cable,
the length of the tightening device is always regular.

BRIEF DESCRIPTION OF THE DRAWING

A drawing is annexed to illustrate the invention wherein

FIG. 1 is a front elevation view of a self-tightening terminal gripper according to the invention, FIG. 2 is a side view of the gripper shown in FIG. 1, FIG. 3 is a sectional view of a hook fixed at the end of an elastic cable by means of the gripper shown in FIG. 1.

DESCRIPTION OF THE PREFERRED EMBODIMENT

As shown in the drawing, the device consists of a gripper 1 having at least two jaws 2 and 3 flaring out in non-assembled condition but closing in when in use. The inner faces of the jaws 2 and 3 are preferably provided with serration-defining notches 4. Each notch 4 meets the outer surface by means of a sloping surface 5. During the assembly, these sloping surfaces 5 facilitate the insertion of the gripper in the wide aperture of the cone of the hook. Jaw 2 is preferably shorter than the other jaw so as to comply with the pitch of the conical spring 6 of the hook 7 to into which the gripper 1 is to be inserted 1.

The two inner surfaces of the gripper 1 are joined at the bottom by a curved surface 8 which leaves a small thickness of material 9 between the surface 8 and the base 10 of the gripper where bending takes place that allows the jaws 2 and 3 to grip the end of the elastic cable 12 when the gripper 1 is inserted by force in the spirally-wound spring cone 6 of the hook 7.

In order to further improve flexing of the gripper jaws, and spread the corresponding stress over several points, two lateral grooves 13 may be provided on the outer surfaces of the jaws 2 and 3 in the neighborhood of the surface 8 which bridges the two inner surfaces 4. These grooves may be on the inner or outer surfaces of the jaws 2 and 3.

In order to secure the hook 7 to the elastic cable 12, the end 11 of the cable 12 is first capped with the gripper 1 and the latter is inserted by force, by means of a machine, in the spring cone 6 of the hook through its wide aperture. The deeper the gripper penetrates into the whorl of the cone 6, the more the jaws 2 and 3 tighten the end 11 of the elastic cable 12 by biting into it.

The gripper 1 is preferably made of plastic material but any suitable other material may be used. It may also be made of three jaws instead of two.

I claim:

1. A terminal gripping device for elastic cord, comprising:
   a. a gripper made of plastic material and having a base and at least two gripping jaws projecting away from said base, said jaws being spaced longitudinally from one another to receive freely therebetween said cord to be gripped;
   b. said jaws and said base being joined to one another in a construction allowing said jaws to flex and move toward one another upon being clamped;
   c. said base including a weakened zone between the joining of said jaws thereto, to ensure flexing of said jaws;
   d. said jaws being thinner in cross-section adjacent said base to ensure further flexing of said jaws, and said jaws in non-assembled position, flare outwardly away from one another;

e. said jaws being formed inwardly with transverse serrations adapted to bite into said elastic cord when said jaws so move toward one another, and f. a connector of wire spirally wound to define a frusto-conical through hole of a size to allow force fitting of aid gripper thereinto whereby, in use, one end of the elastic cord to be gripped is inserted in said gripper between said jaws and said gripper is force fitted into said frusto-conical hole by the large opening thereof causing flexing and gradual closing of said jaws over said cord end and biting of said serrations into said cord end.

2. A device as claimed in claim 1 wherein the inner surfaces of said jaws, at the free ends thereof, are connected to the outer surfaces by arcuate surfaces adapted to ease insertion of said gripper into said connector conical hole.

3. A device as claimed in claim 1 wherein one of said jaws is shorter than the other jaw in compliance with the pitch of said spirally-wound wire.

* * * * *